United States Patent [19]
Bell et al.

[11] Patent Number: 5,758,150
[45] Date of Patent: May 26, 1998

[54] SYSTEM AND METHOD FOR DATABASE SYNCHRONIZATION

[75] Inventors: Dennis Leroy Bell, Littleton; David Lawrence Cozzolino, Denver; Michelle Lee Lee, Parker; Richard Lee Hagen, Colorado Springs, all of Colo.

[73] Assignee: Tele-Communications, Inc., Englewood, Colo.

[21] Appl. No.: 539,957

[22] Filed: Oct. 6, 1995

[51] Int. Cl.⁶ .................................................. G06F 17/30
[52] U.S. Cl. ........................ 395/610; 395/618; 395/616; 364/222.81
[58] Field of Search ........................... 395/610, 618, 395/616; 364/222.81

[56] References Cited

U.S. PATENT DOCUMENTS

| | | | |
|---|---|---|---|
| 4,558,413 | 12/1985 | Schmidt et al. | 395/619 |
| 4,714,996 | 12/1987 | Gladney et al. | 395/619 |
| 4,853,843 | 8/1989 | Ecklund | 395/619 |
| 4,882,674 | 11/1989 | Quint et al. | 395/684 |
| 5,032,979 | 7/1991 | Hecht et al. | 395/187.01 |
| 5,155,847 | 10/1992 | Kirouac et al. | 395/200.51 |
| 5,263,165 | 11/1993 | Janis | 395/490 |
| 5,274,806 | 12/1993 | Hill | 395/610 |
| 5,317,729 | 5/1994 | Mukherjee et al. | 395/603 |
| 5,404,508 | 4/1995 | Konrad et al. | 395/618 |
| 5,440,730 | 8/1995 | Elmasri et al. | 395/619 |
| 5,452,450 | 9/1995 | Delory | 395/610 |
| 5,481,700 | 1/1996 | Thuraisingham | 395/609 |
| 5,495,610 | 2/1996 | Shing et al. | 395/200.51 |
| 5,544,320 | 8/1996 | Konrad | 395/200.09 |
| 5,560,005 | 9/1996 | Hoover et al. | 395/600 |
| 5,561,795 | 10/1996 | Sarkar | 395/618 |
| 5,561,797 | 10/1996 | Gilles et al. | 395/608 |
| 5,590,274 | 12/1996 | Skarpelos et al. | 395/182.05 |
| 5,649,195 | 7/1997 | Scott et al. | 395/617 |

*Primary Examiner*—Thomas G. Black
*Assistant Examiner*—Greta L. Robinson
*Attorney, Agent, or Firm*—Baker & Botts, L.L.P.

[57] ABSTRACT

A database synchronization system (10) is disclosed that synchronizes the content of a central database stored on a central computer (16) with one or more remote databases stored on one or more remote computers (18). A data extract and transfer application (20) is provided on each of the remote computers (18). A migrator application (26) processes the audit trail files (24) of the remote computer (18) to create a database of change (28). When the database of change (28) reaches a size threshold, the data extract and transfer application (20) shuts down the migrator application (26), processes the database of change (28), and restarts the migrator application (26) to begin the creation of another database of change. The data and information in the database of change are converted into a series of flat files (48) that are transferred over a communications line (14) from each of the remote computers (18) to the central computer (16).

24 Claims, 3 Drawing Sheets

SYSTEM AND METHOD FOR DATABASE SYNCHRONIZATION

TECHNICAL FIELD OF THE INVENTION

This invention relates in general to the field of computer systems and more particularly to the field of computer database systems.

BACKGROUND OF THE INVENTION

Often, data and information maintained on a number of remote database systems must be transferred to and consolidated on a central database. Each remote database may contain information and data for a unique geographic or business sector, and each remote database may operate on a database platform different from the database platform of the central database.

In order for the content of a central database to be synchronized with the content of one or more remote databases, an initial update must transfer all the data in each of the remote databases to the central database. For this instant at least, the central database is synchronized with each of the remote databases. As the remote databases are updated, however, the central database falls out of synchronization with the remote databases. In the case of a nationwide system for compiling customer data for cable television, credit card, or mail order companies, the centralized database will often quickly fall out of synchronization as the content of each of the remote databases is changed by updates, additions, or deletions to the customer databases located at one or more remote sites.

In the cable television context, each of the remote databases may contain customer and residence information. The remote databases may be accessed by, for example, one or more remote computers, or remote database servers. The remote computers may be Tandem computers, which comprise a business application platform of fault tolerant, multi processor computers often used for transaction processing. The central database may be accessed by a central database computer, which may, for example, operate on a Unix platform.

In order to transfer changes from each of the remote databases to the central database, it is often necessary to read the audit trail files of each of the remote databases to recognize updates, additions, and deletions to the remote databases. The changes to the remote databases are then processed and placed in a database of change. However, during the period that the database of change is being sent over to the central database, the remote computers continue to create audit trail files as additional changes are made to the remote databases. Because of the delay caused by the transfer of updates to the central database, the audit trail files created by the remote databases are purged as new audit trail files are created. Thus, as the database of change is being transferred to the central database, subsequent updates to the remote database may not be recognized during subsequent reads of the audit trail files, and changes to the remote databases may not be transferred to the central database.

Further, if the connection between the remote databases and the central database fails during the transfer of the database of change to the central database, the data in the database of change could be lost entirely. Also, the central database may not receive the updated information from the remote databases if a CPU on one of the remote database computers fails during the transfer of the database changes to the central database.

Therefore, a need has arisen for a computer system that is able to synchronize the content of a central database with one or more remote databases.

SUMMARY OF THE INVENTION

In accordance with the present invention, a database synchronization system and method is provided that substantially eliminates or reduces the disadvantages and problems associated with previous database synchronization systems. It is therefore an object of the present invention to provide a database synchronization system capable of efficiently synchronizing a central database with one or more remote databases during periods of heavy transaction activity on the remote databases and on the central database. It is a further object of the present invention to provide a database synchronization system capable of robust error detection and error avoidance and correction.

The database synchronization system and method of the present invention comprises a system and method for synchronizing one or more remote databases with a central database. The remote database and the central database may reside on computers with different database platforms. In the cable television context, for example, the remote computers may comprise computers suitable for transaction processing applications.

The database synchronization system and method of the present invention includes a data extract and transfer application stored on one or more remote computers. The audit trail files, which are generated by the remote computers are first read and processed by a migrator application. The migrator application creates a database of change from the updates, additions, and deletions recorded in the audit trail files. When the database of change reaches a size threshold, the data extract and transfer application shuts down the migrator application and renames the database of change. The data extract and transfer application restarts the migrator application so that the migrator application can create another database of change while the renamed database of change is being processed by the data extract and transfer application.

The data extract and transfer application creates a series of flat files from the renamed database of change. The task of creating these files is distributed across the CPUs and storage devices of the remote computers. Because each remote computer has a plurality of CPUs and associated storage devices, the task of creating the flat files from the database of change can be distributed across these available resources. Before assigning a CPU the task of building a flat file on a particular storage device, the data extract and transfer application first determines whether the CPU is operational and whether the associated storage device has available storage space.

The flat files created by the data extract and transfer application are transferred according to a predetermined file transfer protocol across a communications line to the central computer. If the communications line fails during the transfer operation, the data extract and transfer application attempts to repeat the transfer of the flat files until the communications line becomes operational. Once the flat files have been transferred to the central computer, the data extract and transfer application drops the renamed database of change and purges the flat files. The database synchronization system of the present invention allows the migrator application to continue processing the audit trail files of the remote computers while the information contained in the renamed database of change is transferred to the central computer.

BRIEF DESCRIPTION OF THE DRAWINGS

A more complete understanding of the present invention and the advantages associated therewith may be acquired by

Figure 1:
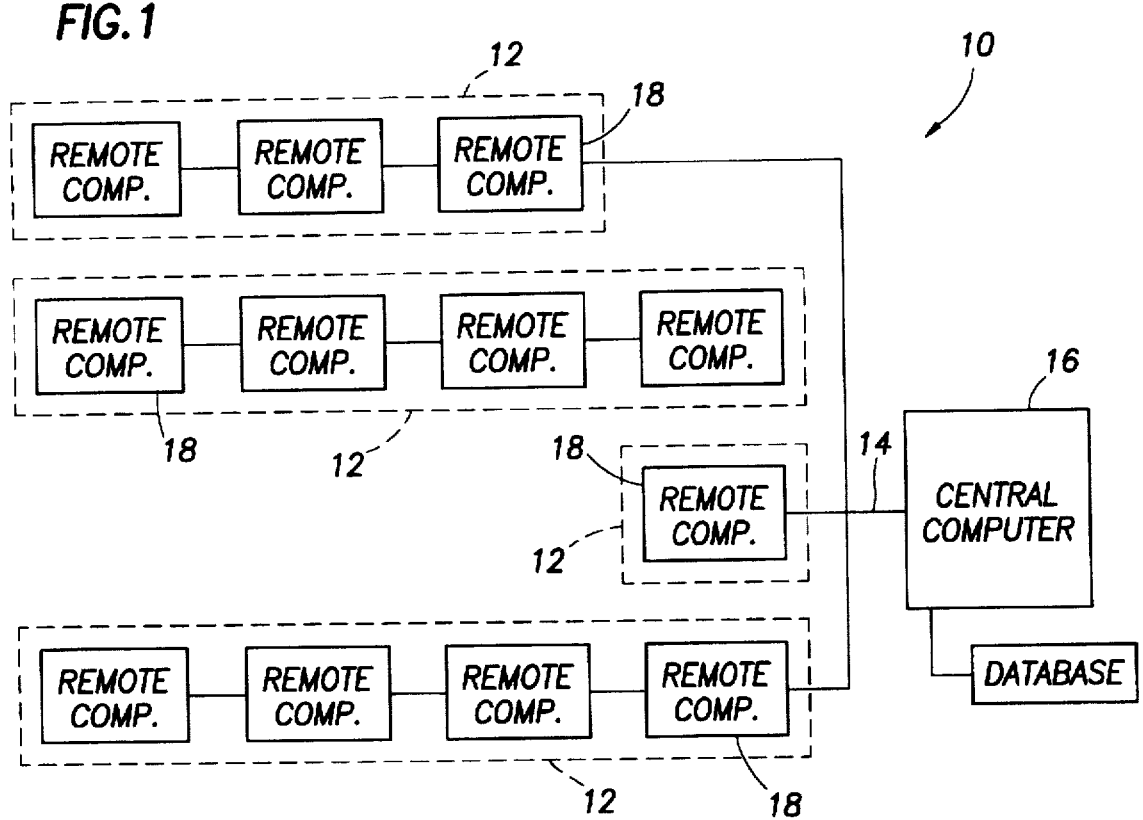
Figure 2:
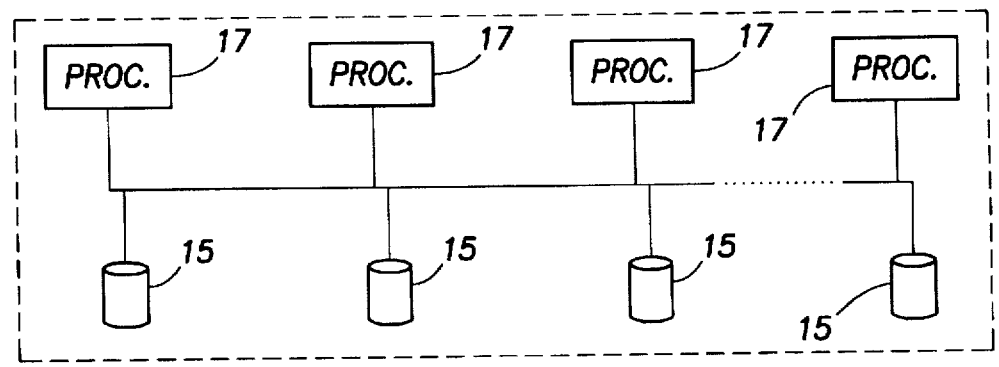
Figure 3:
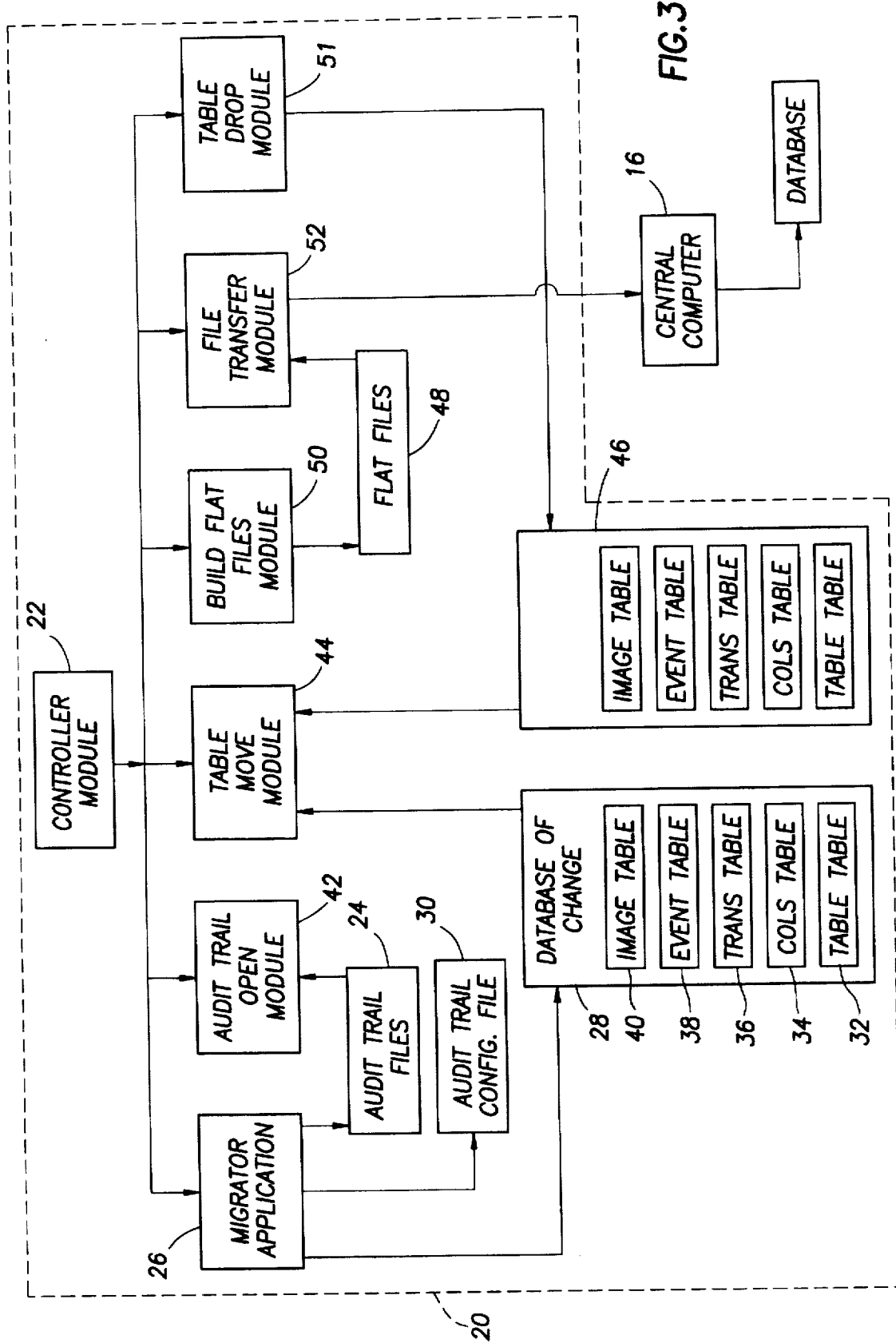
Figure 4:
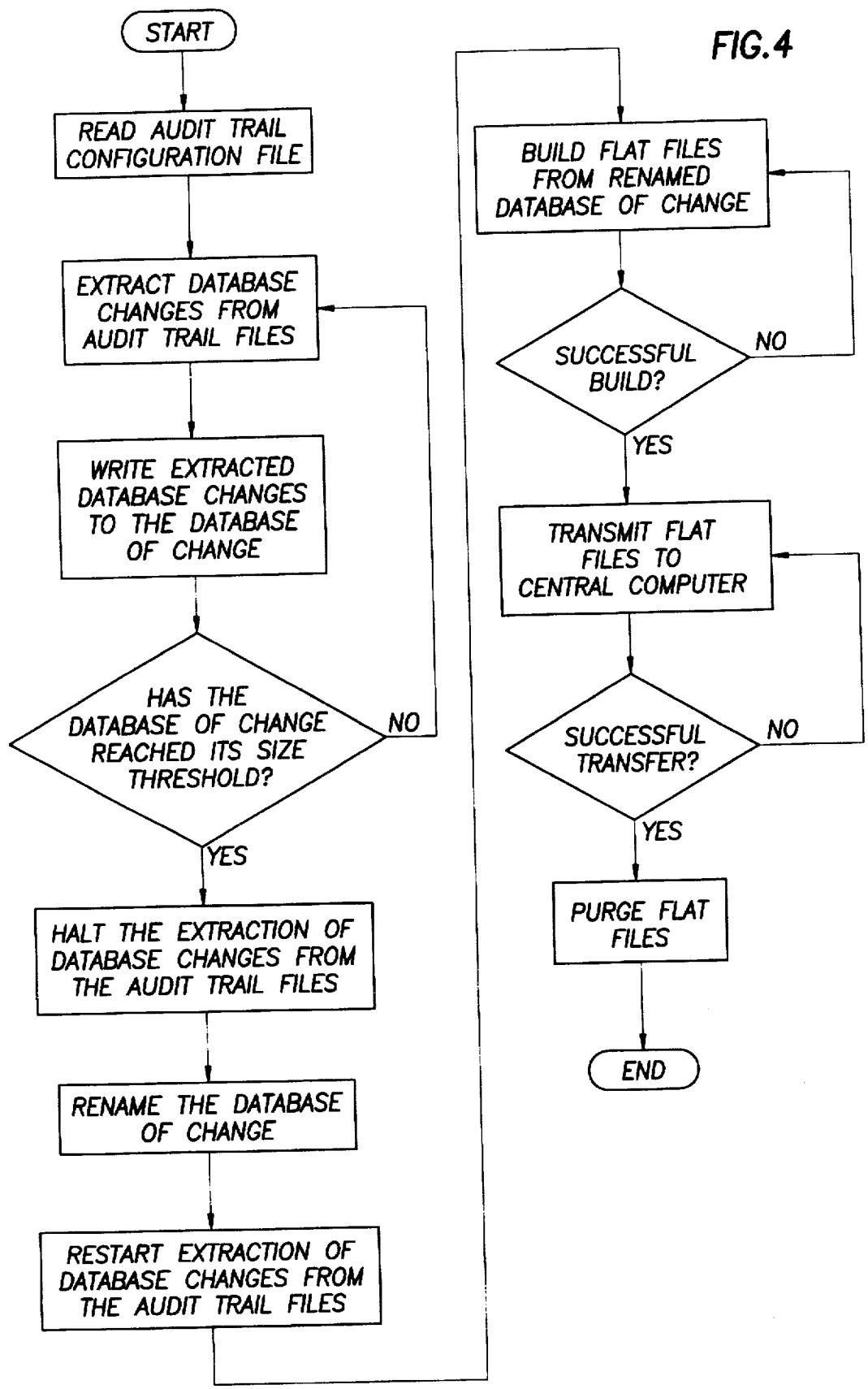

3 referring to the accompanying drawings in which like reference numbers indicate like features and wherein:

FIG. 1 is a graphical representation of the database system of the present invention;

FIG. 2 is a graphical representation of a remote computer according to the present invention;

FIG. 3 is a data flow diagram of the data extract and transfer application of the present invention; and FIG. 4 is a flow chart of the data extract and transfer application of the present invention.

DETAILED DESCRIPTION OF THE INVENTION

FIG. 1 is a graphical representation of a database synchronization system indicated generally at 10. A plurality of remote database systems 12 is connected via a communications line 14 to a central database stored on a central computer 16. In one embodiment of the present invention, communications line 14 may comprise an Ethernet connection, although other transmission mediums may be employed. Each remote database system 12 may include one or more remote computers 18. Remote computers 18 may comprise, for example, Tandem computers of Tandem Computers Inc. of Cupertino, Calif. Tandem computers are fault tolerant, multi processor computers often employed for transaction processing. Other computers, however, may easily be substituted by one of ordinary skill in the art.

Associated with each of remote computers 18 of remote database systems 12 are a plurality of CPUs or central processors 17 and data storage devices 15. Each remote database system 12 may be organized such that data or information for a particular geographic or business sector is located on a particular data storage device 15 or a group of data storage devices.

For a cable television application, an database associated with a remote computer 18 may contain customer and marketing data for those customers of a particular geographic region. For example, a database system in Atlanta may contain the customer and residence information for those customers and residences located in the Atlantic and southern states, while a database system in Sacramento may contain the customer and residence information for those customers and residences in the Pacific states. Central computer 16 may store a central database on a Unix platform.

A data extraction and transfer application 20 is stored on each of remote computers 18. Each remote computer 18, shown in FIG. 2, is able to create and maintain a user-configurable number of audit trail files 24 stored on the remote data storage devices 15. Each remote computer 18 will typically create between five and ten audit trail files 24. Each remote computer 18 can, however, create more than ten audit trails depending on the size of the audit trail files. The audit trail files 24 of each remote computer 18 provide a record of the database transactions for each of the databases stored on the data storage devices 15. Remote computers 18 create the audit trail files 24 in order to maintain the integrity of the databases of the remote computers. If a database on a remote computer 18 is corrupted during a database transaction, the remote computer 18 can access the audit trail files 24 to roll the database back to a stable point free of corruption.

The size of each audit trail file 24 is configurable and can range in size from 50–200 megabytes. In the case of a remote computer 18 having a user-configurable limit of five audit trail files 24, the remote computer 18 writes to and fills the memory of the first of the five audit trail files. After the remote computer 18 has written to and filled the first audit trail file, the remote computer 18 creates and writes to a second audit trail file. After the remote computer 18 writes to and fills the second audit trail file, the remote computer 18 creates and writes to a third audit trail file, and so on. After the remote computer 18 has written to and filled the fifth audit trail file, the remote computer 18 purges the first audit trail file upon the creation of the sixth audit trail file so that only five audit trail files exist at any one time. While changes are being made to the databases on the data storage devices 15, the remote computer 18 continues to purge successive audit trail files 24 as new audit trail files 24 are created to store a record of database transactions.

A migrator application 26, which in one embodiment is TMF Migrator, developed by Unlimited Software Associates of Malvern, Pa., reads and processes the information contained in audit trail files 24. Migrator application 26 is a set of commercially available programs and tools able to synthesize information from the audit trail files 24 to produce a database of change 28. Database of change 28 is a record of all the updates, additions, or deletions made to the databases on the data storage devices 15 during the time period covered by the audit trail files 24 processed by the migrator application 26. To maintain the synchronization of the central database in central computer 16, database of change 28 of each of remote computers 18 must be transmitted periodically to central computer 16.

In the cable television context, the databases associated with remote computer 18 may include a customer database, which contains data on each cable customer, such as subscription and payment information; and a residence database, which contains data for each residence in the cable franchise's service area. Configuration file 30 contains a listing of the categories of database changes to be extracted from the databases and placed in database of change 28. Migrator application 26 reads configuration file 30 and monitors audit trail files 24 for updates, additions, or deletions according to the categories specified in configuration file 30. Thus, configuration file 30 can be defined so that only certain data located in the databases such as particular tables and columns in the databases stored on the data storage devices 15 are extracted and transferred to the central database on central computer 16. For example, in the cable television example, if the central database is a marketing database, then configuration file 30 may be altered so that central computer 16 is synchronized only with the marketing-related data in the databases stored on each of the data storage devices 15, even though other data may be available thereon. As a result, the central database associated with central computer 16 contains marketing-related data and information on the customers and potential customers in the area of operation of the cable television provider.

From audit trail files 24, migrator application 26 extracts updates, additions, and deletions to the particular categories of data specified in configuration file 30 and places this information in database of change 28. Database of change 28 includes five Structured Query Language (SQL) tables. The five tables of database of change 28 contain information on the updates, additions, or deletions to the tables and columns specified in configuration file 30.

Of the five tables in the database of change, the table having the least amount of detail is the Tables Table 32. The fields of Tables Table 32 contain the name and identification number for the tables in the databases associated with remote computers 18 that have experienced updates, additions, or deletions. Columns Table 34 is more detailed than Tables Table 32. The fields of Columns Table 34 contain the name and number of the columns in the tables in the databases that have experienced updates, additions, or deletions during the time period covered by the audit trail files 24 processed by migrator application 26.

The Transaction Table 36 of database of change 28 contains information on each transaction made to the databases stored on the data storage devices 15. The fields of Transaction Table 36 include the transaction identification number, start time, end time, and completion code for each database transaction made to the databases associated with remote computers 18 during the time period covered by the audit trail files 24 processed by migrator application 26. The Event Table 38 contains information on each operation, or event, within each database transaction identified in Transaction Table 36. A single database transaction may have one or more operations. For example, a single database transaction may both add and delete an entry to the customer database. The fields of Event Table 38 include the transaction identification number, table number, event time, and event type.

The Image Table 40 is the most detailed of the five tables in database of change 28 and consequently grows the fastest of the five tables in database of change 28. The fields of Image Table 40 contain the before and after image of each operation within each database transaction. Other fields of Image Table 40 contain information concerning the time of the operation, column number, image type, and text type.

Controller module 22 of data extraction and transfer application 20 starts migrator application 26 and Audit Trail Open module 42. Audit Trail Open Module 42 opens audit trail files 24 prior to the processing of audit trail files 24 by migrator application 26 and keeps audit trail files 24 open during the processing of these files by migrator application 26. So long as a particular audit trail file is open, it cannot be purged by remote computer 18. Once migrator application 26 completes its processing of an audit trail file, Audit Trail Open module 42 releases the processed audit trail file so that it can be purged by remote computer 18, if necessary.

Controller module 22 monitors the growth of database of change 28. Once Image Table 40 reaches a user-configurable size limitation, controller module 22 shuts down migrator application 26. The size limitation of Image Table 40 may preferably range between eight and twenty megabytes. Upon the shutdown of migrator application 26, any audit trail file 24 that is currently being processed by migrator application 26 is kept open by Audit Trail Open module 42 so that migrator application 26 can continue processing the open audit trail file when migrator application 26 is restarted.

During the period that migrator application 26 is shut down, controller module 22 starts Table Move module 44. Table Move module 44 moves database of change 28 by executing an SQL rename command to rename each of the five tables in the database of change. The renamed database of change 46 is now available to be processed by the remainder of data extraction and transfer application 20. Controller module 22 restarts migrator application 26 so that migrator application 26 can resume processing audit trail files 24 to continue extracting updates, additions, and deletions to the databases. The three steps of (1) halting migrator application 26, (2) renaming database of change 28 into renamed database of change 46, and (3) restarting migrator application 26 can begin so that migrator application 26 can begin creating another database of change 28 insure that migrator application 26 is shut down for only a brief period, thereby allowing migrator application 26 to keep up with the extraction of changes from audit trail files 24 and the placement of these changes in database of change 28. Thus, while the remainder of data extraction and transfer application 20 is processing the database changes located in renamed database of change 46, migrator application 26 is able to continue writing a record of the updates, additions, and deletions to the databases stored on the data storage devices 15 to database of change 28.

The data in the tables in renamed database of change 46 are converted to a series of flat files 48 by Build Flat Files module 50. Build Flat Files module 50 builds unstructured flat files 48 from the information contained in renamed database of change 46. Build Flat Files module 50 names flat files 48 in the FDDHHMMI format (where F is the file type, DD is the day of the month, HH and MM are the time, and I is a unique file identifier). The flat files are unstructured and are compatible between otherwise noncompatible computer systems. Once Build Flat Files module 50 has completed the preparation of flat files 48 from renamed database of change 46, Build Flat Files module 50 sends a completion signal to Table Drop module 51. Table Drop module 51 drops renamed database of change 46 once database of change 28 reaches its predetermined size threshold. Thus, renamed database of change 46 is not dropped until database of change 28 reaches its predetermined size threshold to trigger Table Move module 44 to rename database of change 28 to renamed database of change 46 and replace the renamed database of change 46 whose content has already been transferred to central computer 16.

Build Flat Files module 50 distributes the task of building flat files 48 across the processors 17 of each of remote computers 18. As specified above, each remote computer 18 may have a plurality of processors 17. Build Flat Files module 50 first determines whether a particular processor 17 is operational before attempting to build a flat file 48 with that processor. If a processor 17 is found to be nonoperational, Build Flat Files module 50 queries another processor. After a selected processor completes the build of a flat file 48, Build Flat Files module 50 posts a message to controller module 22 that the build of the flat file was successful. If a processor 17 fails during a build of a flat file 48, Build Flat Files module 50 will route the task of building the flat file to another processor.

Each processor 17 is associated with one or more data storage devices 15. In one embodiment of present invention, data storage devices 15 comprise disk drives, but data storage devices may comprise other storage mediums such as tape storage devices, optical storage devices. Build Flat Files module 50 determines whether the data storage device 15 associated with the processor 17 selected by Build Flat Files module 50 has available space. If the data storage device 15 has inadequate space, Build Flat Files module 50 selects another processor 17 and data storage device 15.

After Build Flat Files module 50 has constructed a flat file 48, File Transfer module 52 transfers to central computer 16 a copy of the flat file 48. File Transfer module 52 continuously scans the data storage devices 15 of each of the remote computers 18 for completed flat files. File Transfer module 52 determines whether communications line 14 is available for transfer of flat files 48 to central computer 16. If communications line 14 is not operational, File Transfer module 52 attempts to transfer flat files 48 until communications line 14 becomes operational. File Transfer module 52 transfers the flat files 48 to central computer 16 according to a standard predetermined file transfer protocol. File Transfer module 52 waits for the receipt of a successful transfer signal from the central computer 16 before purging copies of the flat files 48 that have been transferred to central computer 16. If communications line 14 fails during the transfer of flat files 52, flat files 52 are saved on the remote computers 18 and are resent by the remote computers once data line 14 is restored.

Although the present invention has been described in detail, it should be understood the various changes, substitutions, and alterations can be made without departing from the spirit and scope of the invention as defined by the appended claims.

What is claimed is:

1. A database synchronization system, comprising:

a central computer storing a central database;

at least one remote computer remote from the central computer and having at least one associated database;

a communications link coupling the central computer to the remote computer; and a data extract and transfer application stored on the remote computer, including a plurality of audit trail files for storing changes to the associated database, a migrator application capable of processing the audit trail files to extract the changes thereto and convert the changes into a first database of change, a table move module capable of executing a database command to rename the first database of change to allow the migrator application to create a second database of change, a flat file module capable of converting the first database of change into flat files suitable for transfer to the central database, and a file transfer module capable of transferring the flat files to the central computer over the communications link.

2. The database synchronization system of claim 1, further comprising means stored on the remote computer for opening the audit trail files during processing of the audit trail files by the migrator application.

3. The database synchronization system of claim 1, further comprising means stored on the remote computer for dropping the first database of change.

4. The database synchronization system of claim 1, further comprising, means stored on the remote computer for opening the audit trail files during processing of the audit trail files by the migrator application; and means stored on the remote computer for dropping the first database of change.

5. A method for synchronizing the content of a central database stored on a central computer with the content of a remote database stored on a remote computer, comprising the steps of:

processing the audit trail files stored on the remote computer to create a first database of change stored on the remote computer;

stopping the processing of the audit trail files when the database of change reaches a size threshold;

processing the contents of the first database of change into a format suitable for transfer to the central database stored on the central computer;

restarting the processing of the audit trail files to create a second database of change stored on the remote computer; and transferring the processed contents of the first database of change to the central database stored on the central computer.

6. The method for synchronizing the content of a central database stored on a central computer with the content of a remote database stored on a remote computer of claim 5, wherein the step of stopping the processing of the audit trail files when the database of change reaches a size threshold comprises the step of stopping the processing of the audit trail files when the Image Table of the database of change reaches a size threshold.

7. The method for synchronizing the content of a central database stored on a central computer with the content of a remote database stored on a remote computer of claim 5, wherein the step of stopping the processing of the audit trail files when the Image Table of the database of change reaches a size threshold comprises the step of stopping the processing of the audit trail files when the Image Table reaches a size threshold of between approximately eight and approximately twenty megabytes.

8. The method for synchronizing the content of a central database stored on a central computer with the content of a remote database stored on a remote computer of claim 5, wherein the step of processing the contents of the first database of change comprises the step of building flat files from the data stored on the first database of change; and wherein the step of transferring the processed contents of the first database of change to the central database stored on the central computer comprises the step of transferring the flat files to the central database stored on the central computer.

9. The method for synchronizing the content of a central database stored on a central computer with the content of a remote database stored on a remote computer of claim 8, further comprising the step of dropping the first database of change.

10. The method for synchronizing the content of a central database stored on a central computer with the content of a remote database stored on a remote computer of claim 8, wherein the step of building flat files from the data stored on the first database of change further comprises the steps of, selecting a processor and an associated data storage device on the remote computer for building one or more flat files;

determining whether the processor is operational;

selecting the data from the first database of change; and building flat files if the processor is determined to be operational.

11. The method for synchronizing the content of a central database stored on a central computer with the content of a remote database stored on a remote computer of claim 8, wherein the step of building flat files from the data stored on the first database of change further comprises the steps of, selecting a first processor of several available processors and an associated data storage device on the remote computer for building one or more flat files;

determining whether the first processor is operational;

selecting among the several available substitute processors if it is determined that the first processor is nonoperational and repeating the selection until an operational processor is found;

selecting the data from the first database of change;

building flat files on the selected processor.

12. The method for synchronizing the content of a central database stored on a central computer with the content of a remote database stored on a remote computer of claim 8, wherein the step of building flat files from the data stored on the first database of change further comprises the steps of, selecting a processor and an associated data storage device for building one or more flat files;

determining whether the data storage device has available space;

selecting the data from the first database of change; and building flat files if the data storage device is determined to have available space.

13. The method for synchronizing the content of a central database stored on a central computer with the content of a remote database stored on a remote computer of claim 8, wherein the data storage device is a disk drive.

14. The method for synchronizing the content of a central database stored on a central computer with the content of a remote database stored on a remote computer of claim 8, wherein the data storage device is a tape drive storage device.

15. The method for synchronizing the content of a central database stored on a central computer with the content of a remote database stored on a remote computer of claim 8, wherein the data storage device is an optical disk storage device.

16. The method for synchronizing the content of a central database stored on a central computer with the content of a remote database stored on a remote computer of claim 8, wherein the step of building flat files from the data stored on the first database of change further comprises the steps of, selecting a processor and an associated data storage device for building one or more flat files;

determining whether the data storage device has available space;

determining whether the processor is operational;

selecting the data from the first database of change; and building flat files if the data storage device is determined to have available space and the processor is determined to be operational.

17. The method for synchronizing the content of a central database stored on a central computer with the content of a remote database stored on a remote computer of claim 5, wherein the step of processing the contents of the first database of change comprises the step of building flat files from the data stored on the first database of change; and wherein the step of transferring the processed contents of the first database of change to the central database stored on the central computer comprises the steps of, determining whether the communications line between the central computer and the remote computer is operational; and transferring the flat files from the remote computer to the central database stored on the central computer across the communications line when the communications line becomes operational.

18. The method for synchronizing the content of a central database stored on a central computer with the content of a remote database stored on a remote computer of claim 17, further comprising the step of dropping the first database of change.

19. A method for synchronizing the content of a central database stored on a central computer with the content of a remote database stored on a remote computer, comprising the steps of:

processing the audit trail files stored on the remote computer to create a first database of change stored on the remote computer;

stopping the processing of the audit trail files when the database of change reaches a size threshold;

restarting the processing of the audit trail files to create a second database of change in the remote computer;

selecting a CPU and an associated disk drive for building one or more flat files;

determining whether the CPU is operational;

determining whether the disk drive has available space;

selecting the data from the first database of change;

building a plurality of flat files if the CPU is determined to be operational and the disk drive is determined to have available space; and transferring the flat files to the central computer.

20. The method for synchronizing the content of a central database stored on a central computer with the content of a remote database stored on a remote computer of claim 19, further comprising the step of dropping the first database of change after successful receipt of the plurality of flat files by the central computer.

21. The method for synchronizing the content of a central database stored on a central computer with the content of a remote database stored on a remote computer of claim 19, wherein the step of stopping the processing of the audit trail files when the database of change reaches a size threshold comprises the step of stopping the processing of the audit trail files when the Image Table of the database of change reaches a size threshold.

22. The method for synchronizing the content of a central database stored on a central computer with the content of a remote database stored on a remote computer of claim 19, wherein the step of stopping the processing of the audit trail files when the Image Table of the database of change reaches a size threshold comprises the step of stopping the processing of the audit trail files when the Image Table reaches a size threshold of between approximately eight and approximately twenty megabytes.

23. The method for synchronizing the content of a central database stored on a central computer with the content of a remote database stored on a remote computer of claim 19, further comprising the step of dropping the first database of change after successful receipt of the plurality of flat files by the central computer.

24. The method for synchronizing the content of a central database stored on a central computer with the content of a remote database stored on a remote computer of claim 19, wherein the step of transferring the flat files to the central computer comprises the steps of, determining whether the data line between the central computer and the remote computer is operational; and transferring the flat files from the remote computer to the central database stored on the central computer across the data line when the data line becomes operational.

* * * * *